(12) United States Patent
Lee et al.

(10) Patent No.: US 7,821,542 B2
(45) Date of Patent: Oct. 26, 2010

(54) SYSTEM AND METHOD FOR RESTRICTING USE OF CAMERA OF A MOBILE TERMINAL

(75) Inventors: Jong-Hyup Lee, Seoul (KR); Jun-Ho Lee, Seoul (KR)

(73) Assignee: LG Electronics, Inc., Seoul (KR)

( * ) Notice: Subject to any disclaimer, the term of this patent is extended or adjusted under 35 U.S.C. 154(b) by 1754 days.

(21) Appl. No.: 10/888,625

(22) Filed: Jul. 9, 2004

(65) Prior Publication Data

US 2005/0007456 A1    Jan. 13, 2005

(30) Foreign Application Priority Data

Jul. 12, 2003  (KR) ...................... 10-2003-0047527
Jul. 18, 2003  (KR) ...................... 10-2003-0049362

(51) Int. Cl.
*H04N 5/232* (2006.01)

(52) U.S. Cl. ................................ 348/211.99; 455/456.1

(58) Field of Classification Search ............ 348/211.99, 348/211.1, 211.2, 211.9; 455/456.4, 456.1–456.3
See application file for complete search history.

(56) References Cited

U.S. PATENT DOCUMENTS

| | | | |
|---|---|---|---|
| 6,433,818 B1* | 8/2002 | Steinberg et al. | ............ 348/161 |
| 2001/0005681 A1 | 6/2001 | Kim | |
| 2002/0106202 A1* | 8/2002 | Hunter | ........................ 396/56 |
| 2003/0008662 A1* | 1/2003 | Stern et al. | ................... 455/456 |

FOREIGN PATENT DOCUMENTS

| | | |
|---|---|---|
| EP | 1139684 A1 | 4/2001 |
| EP | 1 298 954 A1 | 2/2003 |
| JP | 11-008885 | 1/1999 |
| JP | 11-261674 | 9/1999 |
| JP | 2000-152217 | 5/2000 |
| JP | 2000-224661 | 8/2000 |
| JP | 2001-025070 | 1/2001 |
| JP | 2001-069546 | 3/2001 |
| JP | 2001-160985 | 6/2001 |
| JP | 2002-027554 | 1/2002 |
| JP | 2002-112214 | 4/2002 |
| JP | 2002-135838 | 5/2002 |
| JP | 2002-218535 | 8/2002 |
| JP | 2004-140725 | 5/2004 |
| JP | 2004-247819 | 9/2004 |
| KR | 1020000031051 | 6/2000 |
| KR | 1020030071502 A | 9/2003 |

* cited by examiner

*Primary Examiner*—Tuan Ho
(74) *Attorney, Agent, or Firm*—Lee, Hong, Degerman, Kang & Waimey

(57) ABSTRACT

A method, system and apparatus for restricting, within a specific area, the photographing function of a camera mounted in a mobile terminal. A control signal is transmitted to a mobile terminal within a photograph-prohibited area and the mobile terminal disables the camera. Upon leaving the photograph-prohibited area, the camera is enabled.

7 Claims, 6 Drawing Sheets

SYSTEM AND METHOD FOR RESTRICTING USE OF CAMERA OF A MOBILE TERMINAL

CROSS-REFERENCE TO RELATED APPLICATIONS

Pursuant to 35 U.S.C. §119(a), this application claims the benefit of earlier filing date and right of priority to Korean Application No. 47527/2003, filed on Jul. 12, 2003 and Korean Application No. 49362/2003, filed on Jul. 18, 2003, the contents of which are hereby incorporated by reference herein in their entirety:

BACKGROUND OF THE INVENTION

1. Field of the Invention

The present invention relates to a mobile terminal and, more particularly, to a method, system and apparatus for restricting, within a specific area, the photographing function of a camera mounted in a mobile terminal.

2. Description of the Related Art

Many mobile terminals currently available in the market have a high-pixel digital camera. The capabilities of the cameras vary widely in performance, for example from a camera having 0.3 million pixels to a camera having a 1.3 million pixels. The cameras also vary in type, for example cameras having CMOS (Complementary Metal-Oxide-Silicon) technology and cameras having CCD (Charge Coupled Device) technology. Some mobile terminals have cameras that can record video as well as still images.

Despite the high cost, mobile terminals having high performance cameras mounted therein are popular with consumers and their popularity is increasing. Users can take photographs or video easily and quickly and at any time and anywhere by using a high performance mobile terminal mounted camera.

However, mobile terminal mounted high performance cameras pose problems with regard to invasive or illegal activities that compromise personal privacy, intellectual property protection and security. Some mobile terminal users have used these cameras to take photos or video in places such as a public bath, a locker room, a photo-prohibited museum exhibition or in a military installation where National security is a concern.

Although regulations related to the use of mobile terminal mounted cameras have been implemented, it is difficult to enforce such regulations since the small size of the cameras make them hard to recognize. Therefore, a method, system and apparatus is needed for easily and effectively restricting, within a specific area, the photographing function of a camera mounted in a mobile terminal without inconveniencing the user or interfering with the use of the camera in areas in which photography is not restricted. The present invention addresses these and other needs.

SUMMARY OF THE INVENTION

The present invention is directed to a method, system and apparatus for restricting, within a specific area, the photographing function of a camera mounted in a mobile terminal while still allowing the photographing function of the camera to operate outside the specific area.

Additional features and advantages of the invention will be set forth in the description which follows, and in part will be apparent from the description, or may be learned by practice of the invention. The objectives and other advantages of the invention will be realized and attained by the structure particularly disclosed in the written description and claims herein as well as the appended drawings.

To achieve these and other advantages and in accordance with the purpose of the present invention, as embodied and broadly described, the present invention is embodied in a mobile terminal that disables the photographing function of a camera mounted therein when the terminal is in an area where photographing is prohibited and enables the photographing function of the camera when the terminal is not within a photograph-prohibited area. Specifically, a network transmits a control signal to disable the photographing function of a camera mounted in any mobile terminal within the photograph-prohibited area and, upon receipt of the control signal, the mobile terminal restricts the photographing function of a camera mounted therein. Although the invention is described herein with regard to a mobile communication device, it is contemplated that the invention may be utilized anytime it is desired to disable the photographing function of a camera within a specific area while enabling the photographing function when the camera is outside the specific area.

In one aspect of the invention, a method for restricting use of a camera mounted in a mobile terminal is provided. The method includes sending a control signal to the mobile terminal when it is within a photograph-prohibited area to indicate that camera use is prohibited, receiving the control signal in the mobile terminal and disabling the camera, and enabling the camera when the mobile terminal is no longer in a photograph-prohibited area.

In one embodiment of the method, a flag such as a control signal including photographing prohibition information is transmitted periodically via a local area wireless communication within a photograph-prohibited area such that any mobile terminal within the area receives the flag. In a preferred embodiment, the local area wireless communication is IrDA (Infra-red Data Association), bluetooth or RF.

Upon receipt of the flag, the mobile terminal disables the camera mounted therein. The mobile terminal operates a timer upon receiving the flag. If another flag is received before the timer expires because the mobile terminal is still within the photograph-prohibited area, the timer is reset. If another flag is not received before the timer expires because the mobile terminal is no longer within the photograph-prohibited area, the camera is enabled. In this way, the camera mounted in a mobile terminal may be disabled when the mobile terminal is within a photograph-prohibited area and enabled when the mobile terminal leaves the photograph-prohibited area.

In another embodiment of the method, a management sector including one or more photograph-prohibited areas is monitored. The presence of a mobile terminal within a photograph-prohibited area is detected, as is the movement of mobile terminals outside the photograph-prohibited area.

When a mobile terminal is detected within the photograph-prohibited area, a first flag such as a control signal including photographing prohibition information is transmitted through a certain channel to the mobile terminal. In a preferred embodiment, the flag is transmitted through a paging channel. When a mobile terminal to which the first flag has been transmitted leaves the photograph-prohibited area, the presence of the mobile terminal outside the area is detected and a second flag such as a control signal including photographing prohibition release information is transmitted to the mobile terminal.

When a mobile terminal receives the first flag, the mobile terminal disables the camera mounted therein. When a mobile terminal receives the second flag, the mobile terminal enables the camera mounted therein. In this way, the camera mounted in a mobile terminal may be disabled when the mobile terminal is within a photograph-prohibited area and enabled when the mobile terminal leaves the photograph-prohibited area.

In another aspect of the invention, a system for restricting use of a camera mounted in a mobile terminal is provided. The system includes a plurality of mobile terminals having a camera mounted therein and one or more transmitting units that transmit a flag to any mobile terminal within a photograph-prohibited area. It is contemplated that the camera may be an externally mounted or internally mounted digital camera.

In one embodiment of the system, a plurality of control signal transmitters are located within a photograph-prohibited area. Each transmitter periodically transmits a flag such as a control signal including photographing prohibition information via a local area wireless communication within a portion of the photograph-prohibited area such that any mobile terminal within the area receives the flag. In a preferred embodiment, the local area wireless communication is IrDA (Infra-red Data Association), bluetooth or RF.

Each mobile terminal that receives the flag disables the camera mounted therein. Upon receiving the flag, a mobile terminal operates a timer. If another flag is received before the timer expires because the mobile terminal is still within a photograph-prohibited area, the timer is reset. If another flag is not received before the timer expires because the mobile terminal is no longer within a photograph-prohibited area, the camera is enabled. In this way, a camera mounted in a mobile terminal may be disabled when the mobile terminal is within a photograph-prohibited area and enabled when the mobile terminal leaves the photograph-prohibited area.

In another embodiment of the system, a network monitors a management sector that includes one or more photograph-prohibited areas. The network tracks the position of all mobile terminals within the management sector in order to detect the presence of mobile terminals within a photograph-prohibited area as well as the movement of mobile terminals outside the photograph-prohibited areas. It is contemplated that a GPS satellite may be utilized to track the position of the mobile terminals When a mobile terminal is detected within a photograph-prohibited area, the network transmits a first flag such as a control signal including photographing prohibition information through a certain channel to the mobile terminal. In a preferred embodiment, the flag is transmitted through a paging channel. When a mobile terminal to which the first flag has been transmitted leaves the photograph-prohibited area, the presence of the mobile terminal outside the area is detected and the network transmits a second flag such as a control signal including photographing prohibition release information to the mobile terminal.

Each mobile terminal that receives the first flag disables the camera mounted therein. Each mobile terminal that receives the second flag enables the camera mounted therein. In this way, the camera mounted in a mobile terminal may be disabled when the mobile terminal is within a photograph-prohibited area and enabled when the mobile terminal leaves the photograph-prohibited area.

In yet another aspect of the invention, a mobile terminal for restricting use of a camera mounted therein is provided. The mobile terminal includes a transmitter, a receiver, a camera and a processing unit.

The receiver receives wireless communications from the network and other mobile terminals, for example a control signal to disable the camera when the mobile terminal is within a photograph-prohibited area. The processing unit performs the methods of the present invention to disable the camera when the mobile terminal is not within a photograph-prohibited area and enable the camera when the mobile terminal is not within a photograph-prohibited area. A storage unit may be provided to store a preset timeout time of a counter used to enable the camera when the mobile terminal is not within a photograph-prohibited area.

In yet another aspect of the invention, a network for restricting use of a camera mounted in a mobile terminal is provided. The network includes a transmitter, a receiver, a storage unit, and a controller.

The transmitter transmits wireless communications to mobile terminals, for example a control signal to disable a camera mounted in a mobile terminal when the mobile terminal is within a photograph-prohibited area. The receiver receives information from mobile terminals and other wireless communication devices, for example position data from a GPS satellite related to a mobile terminal. The storage unit stores information related to wireless communication with mobile terminals, for example position data related to mobile terminals being monitored. The controller performs the methods of the present invention to disable the camera when the mobile terminal is not within a photograph-prohibited area and enable the camera when the mobile terminal is not within a photograph-prohibited area.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention relates to method, system and apparatus for restricting, within a specific area, the photographing function of a camera mounted in a mobile terminal. Although the invention is described herein with regard to a mobile communication device, it is contemplated that the invention may be utilized anytime it is desired to disable the photographing function of a camera within a specific area while enabling the photographing function when the camera is outside the specific area.

In describing the present invention, if a detailed explanation for a related known function or construction is considered to be unnecessary, such explanation has been omitted but would be understood by those skilled in the art.

Figure 1:
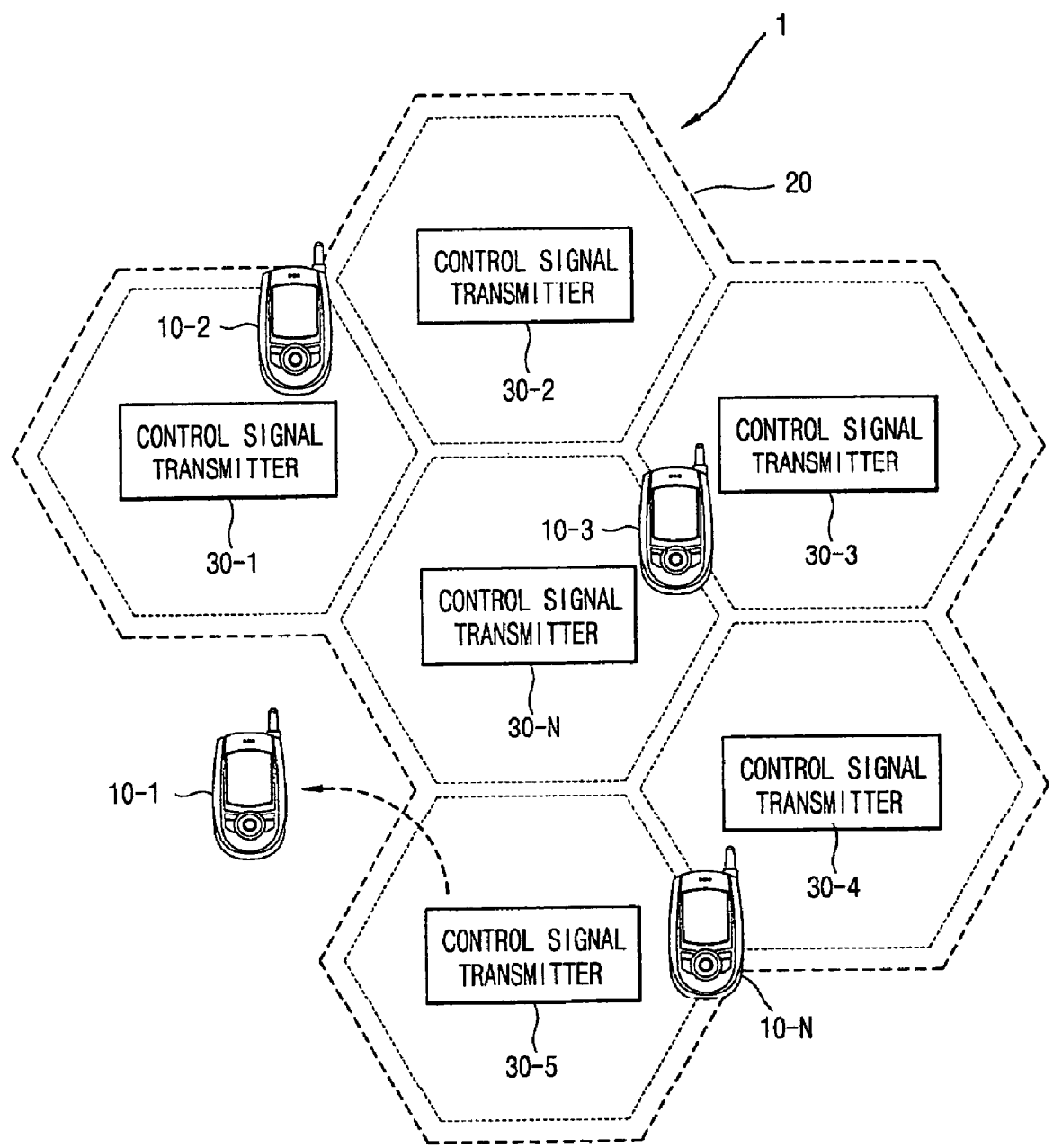
FIG. 1 illustrates a system for restricting use of a camera mounted in a mobile terminal in accordance with one embodiment of the present invention.

FIG. 1 illustrates one embodiment of a system for restricting use of a camera mounted in a mobile terminal. The system 1 includes a plurality of mobile terminals 10-1 to 10-N and a plurality of control signal transmitters 30-1 to 30-N positioned in a photograph-prohibited area 20.

Each control signal transmitter 30-1 to 30-N periodically transmits a control signal via a local area wireless communication. The local area wireless communication may be IrDA (Infrared Data Association), bluetooth or RF. The control signal includes photographing prohibition information, for example a logical value or flag signifying photograph prohibition.

Since an effective range of the local area wireless communication is not wide, the system 1 is suitable for a small area such as in a building. However, providing multiple control signal transmitters 30-1 to 30-N may cover a wider area. The control signal transmitters 30-1 to 30-N are arranged such that any mobile terminal 10-2 to 10-N which enters into the photograph-prohibited area 20 receives at least one control signal.

Each mobile terminal 10-1 to 10-N has either an internally mounted or externally mounted digital camera. Each mobile terminal is internally set to restrict the photographing function of the camera upon receiving a control signal from a control signal transmitter 30-1 to 30-N within the photograph-prohibited area 20, thereby disabling the camera.

Upon receiving a control signal, a mobile terminal 10-1 to 10-N operates a timer. If the mobile terminal 10-1 to 10-N receives another control signal from a control signal transmitter 30-1 to 30-N before a previously set timer expiration time, the timer is reset. Conversely, if no control signal is received from a control signal transmitter 30-1 to 30-N before the previously set timer expiration time, the timer expires and the mobile terminal 10-1 to 10-N releases the previously restricted photographing function, thereby enabling the camera.

Since the plurality of control signal transmitters 30-1 to 30-N periodically transmit control signals within the photograph-prohibited area 20, the timer of a mobile terminal 10-2 to 10-N within the photograph-prohibited area will not expire once it receives a control signal from one particular control signal transmitter even if the mobile terminal moves out of the range of the particular control signal transmitter but still within the photograph-prohibited area because the terminal will receive a control signal from another control signal transmitter. Therefore, once the camera of a mobile terminal 10-2 to 10-N within the photograph-prohibited area 20 is disabled by a control signal, the camera will remain disabled as long as the mobile terminal remains within the photograph-prohibited area.

However, if a mobile terminal 10-1 moves out of the photograph-prohibited area after the camera mounted therein is disabled in response to a control signal, the timer will expire after the preset time elapses and the camera will once again be enabled. Therefore, the camera of a mobile terminal 10-2 to 10-N within the photograph-prohibited area 20 will remain disabled only until the mobile terminal moves outside the photograph-prohibited area. Thereafter, the photograph-function of the mobile terminal 10-1 can be performed normally.

As long as the time between periodic transmissions of the control signal by each of the control signal transmitters 30-1 to 30-N is less than the preset expiration time of the timer in each mobile terminal 10-1 to 10-N, the system 1 will function properly. For example, if the control signal is transmitted every 5 seconds and the preset expiration time for the timer is 10 seconds, when a mobile terminal 10-1 to 10-N receives a first control signal, the camera photographing function is restricted and the timer is set to expire in 10 seconds. If the mobile terminal 10-1 to 10-N remains within the photograph-prohibited area 20, another control signal is received in 5 seconds or less, thereby resetting the timer before it expires. The camera photographing function is continuously restricted while the mobile terminal 10-1 to 10-N remains within the photograph-prohibited area 20.

Conversely, if a mobile terminal 10-1 moves outside the photograph-prohibited area 20 after a control signal is received, the camera is disabled and the timer is started, another control signal would not be received in 10 seconds, thereby allowing the timer to expire and the restriction of the camera photographing function is released. The camera will operate without restriction until the mobile terminal 10-1 moves within a photograph-prohibited area 20

It is contemplated that the time between periodic transmissions of the control signal and the preset expiration time of the timer may be selected based on the requirements of the system 1. The sensitivity of the photograph prohibition and the need to avoid unnecessary inconvenience to the user of a mobile terminal may be considered.

For example, a shorter time between periodic transmissions of the control signal and a longer preset expiration time of the timer may be selected if the photograph-prohibited area 20 is a military facility in which sensitive data is stored, while a longer time between periodic transmissions of the control signal and a shorter preset expiration time of the timer may be selected if the photograph-prohibited area is a museum. Furthermore, it is contemplated that additional control signal transmitters 30-1 to 30-N may be provided to prevent "dead zones" between the effective ranges of control signal transmitters if the sensitivity of the photograph prohibition is high in order to preclude a timer from expiring and a camera from being enabled within the photograph-prohibited area.

Figure 2:
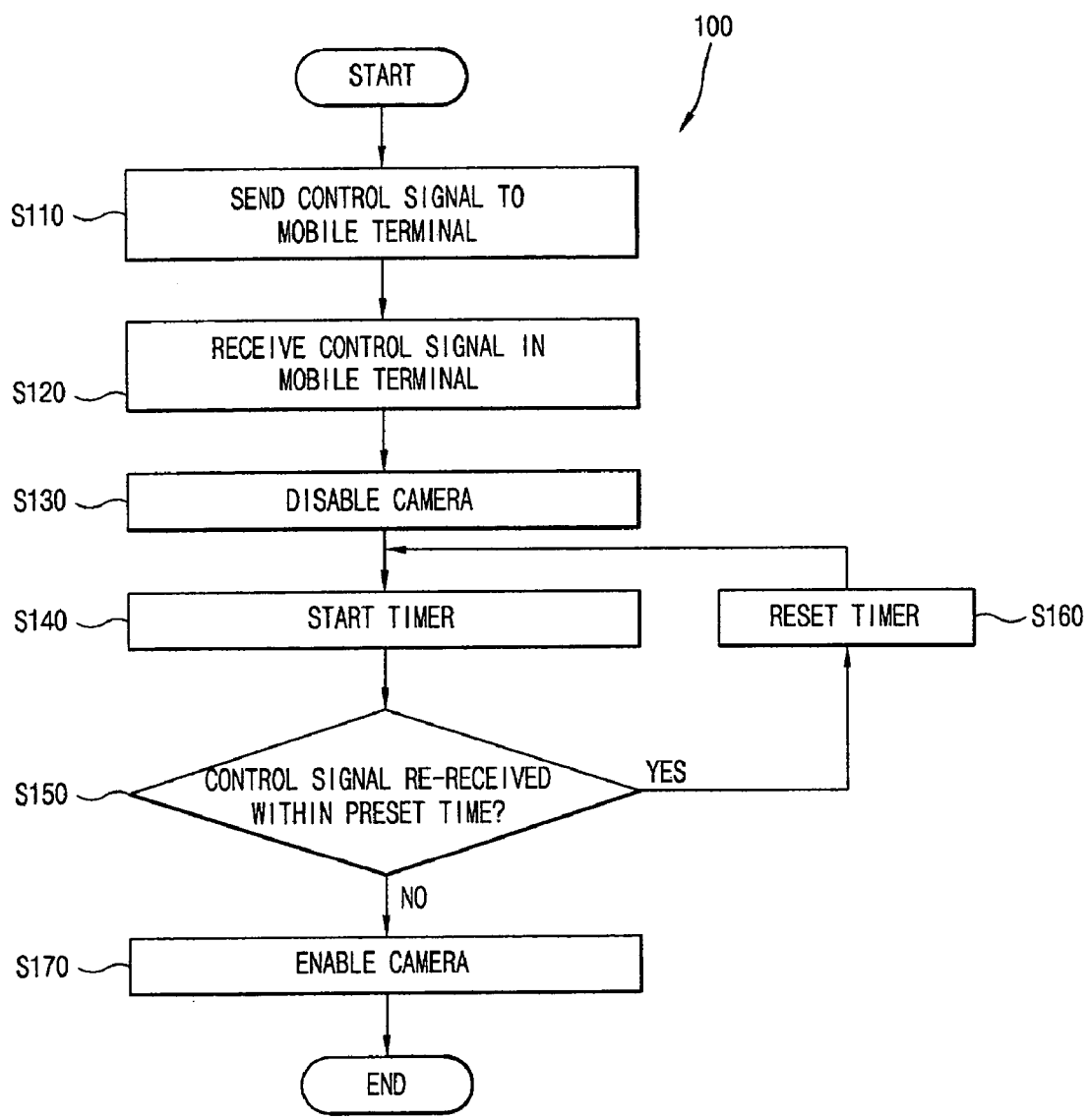
FIG. 2 illustrates a flow chart of a method for restricting use of a camera mounted in a mobile terminal in accordance with one embodiment of the present invention.

FIG. 2 illustrates a flow chart of one embodiment of a method for restricting use of a camera mounted in a mobile terminal. The method 100 includes sending a control signal to a mobile terminal 10-2 to 10-N that is within a photograph-prohibited area 20 (S110), receiving the control signal in the mobile terminal (S120), disabling the camera (S130) and enabling the camera when the mobile terminal is no longer within a photograph-prohibited area (S150 to S170).

In step S110, a control signal is sent to a mobile terminal 10-2 to 10-N that has entered a photograph-prohibited area 20. The control signal may be a flag including photographing prohibition information and may be transmitted periodically via a local area wireless communication such as IrDA, bluetooth or RF.

The mobile terminal 10-2 to 10-N that has entered a photograph-prohibited area 20 receives the control signal in step S120. Upon receiving the control signal, the mobile terminal 10-2 to 10-N disables the camera in step S130, for example by performing an internal setting to restrict a photographing function of the camera.

As illustrated in FIG. 2, a mobile terminal 10-1 that has moved outside a photograph-prohibited area 20 enables the camera mounted therein by utilizing a timer. Upon receiving the control signal in step S130, the timer is started in step S140. It is determined in step S150 if another control signal is received before a preset timer expiration time. If no control signal is received before the timer expires because the terminal 10-1 has moved outside a photograph-prohibited area 20, the camera is enabled in step S170. If another control signal is received before the timer expires because the terminal 10-2 to 10-N is still within a photograph-prohibited area 20, the timer is reset in step S160 and the determination of step S150 is repeated.

Figure 3:
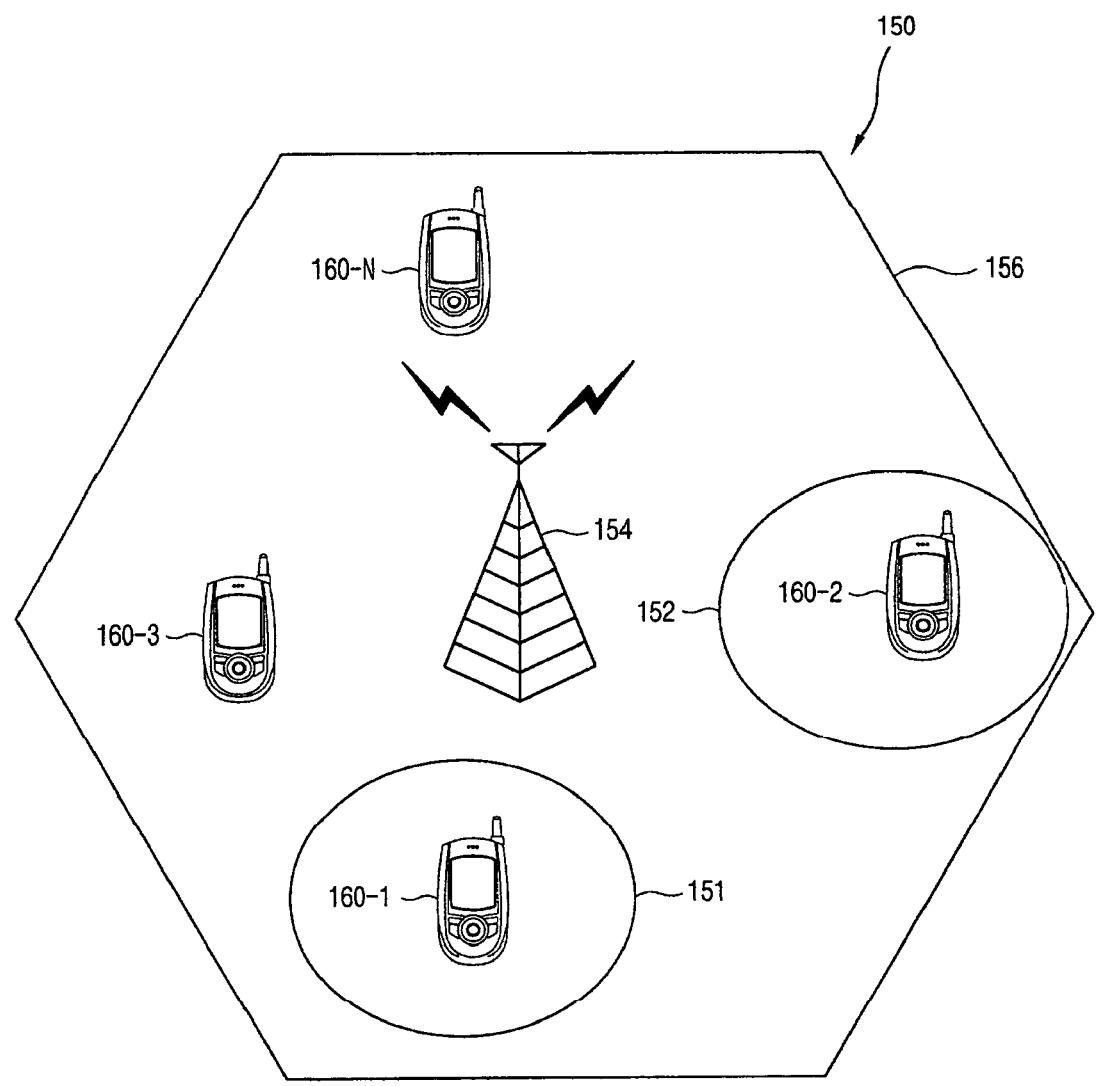
FIG. 3 illustrates a system for restricting use of a camera mounted in a mobile terminal in accordance with another embodiment of the present invention.

FIG. 3 illustrates another embodiment of a system for restricting use of a camera mounted in a mobile terminal. The system 150 includes a plurality of mobile terminals 160-1 to 160-N and a network 154 located in a management sector 156 having a plurality of photograph-prohibited areas 151, 152.

The network 154 monitors the position of all mobile terminals 160-1 to 160-N within the management sector 156. The network 154 may receive position information regarding the mobile terminals 160-1 to 160-N from a GPS satellite.

Each mobile terminal 160-1 to 160-N has either an internally mounted or externally mounted digital camera. Each mobile terminal is internally set to restrict the photographing function of the camera upon receiving a first flag from the network 154, thereby disabling the camera. Each mobile terminal is internally set to release the restricted photographing function of the camera upon receiving a second flag from the network 154, thereby enabling the camera.

The network 154 stores information regarding the photograph-prohibited areas 151, 152 in its management sector 156. Upon determining that a mobile terminal 160-1, 160-2 is within a photograph-prohibited area 151,152, the network transmits a first flag to the mobile terminal through a certain channel, for example a paging channel. The first flag includes photographing prohibition information. When a mobile terminal 160-1, 160-2 within a photograph-prohibited area 151, 152 receives the first flag, the camera mounted therein is disabled.

Upon determining that a mobile terminal 160-3 to which a first flag was previously transmitted has moved outside the photograph-prohibited areas 151, 152 of the management sector 156, the network 154 transmits a second flag to the mobile terminal. The second flag includes photographing prohibition release information. When a mobile terminal 160-3 that has moved outside the photograph-prohibited areas 151, 152 receives the second flag, the camera mounted therein is enabled. When the mobile terminal 160-3 is out of the photograph-prohibited areas 151, 152, the photographing function of the camera mounted therein may be used normally.

The system 150 illustrated in FIG. 3 is suitable for a wide range of photograph-prohibited areas. The system 150 is specifically well suited for large areas such as a military security area. It is contemplated that multiple networks 154, each monitoring a management sector 156, may be provided in order to cover a larger area in which photograph prohibition is desired.

Figure 4:
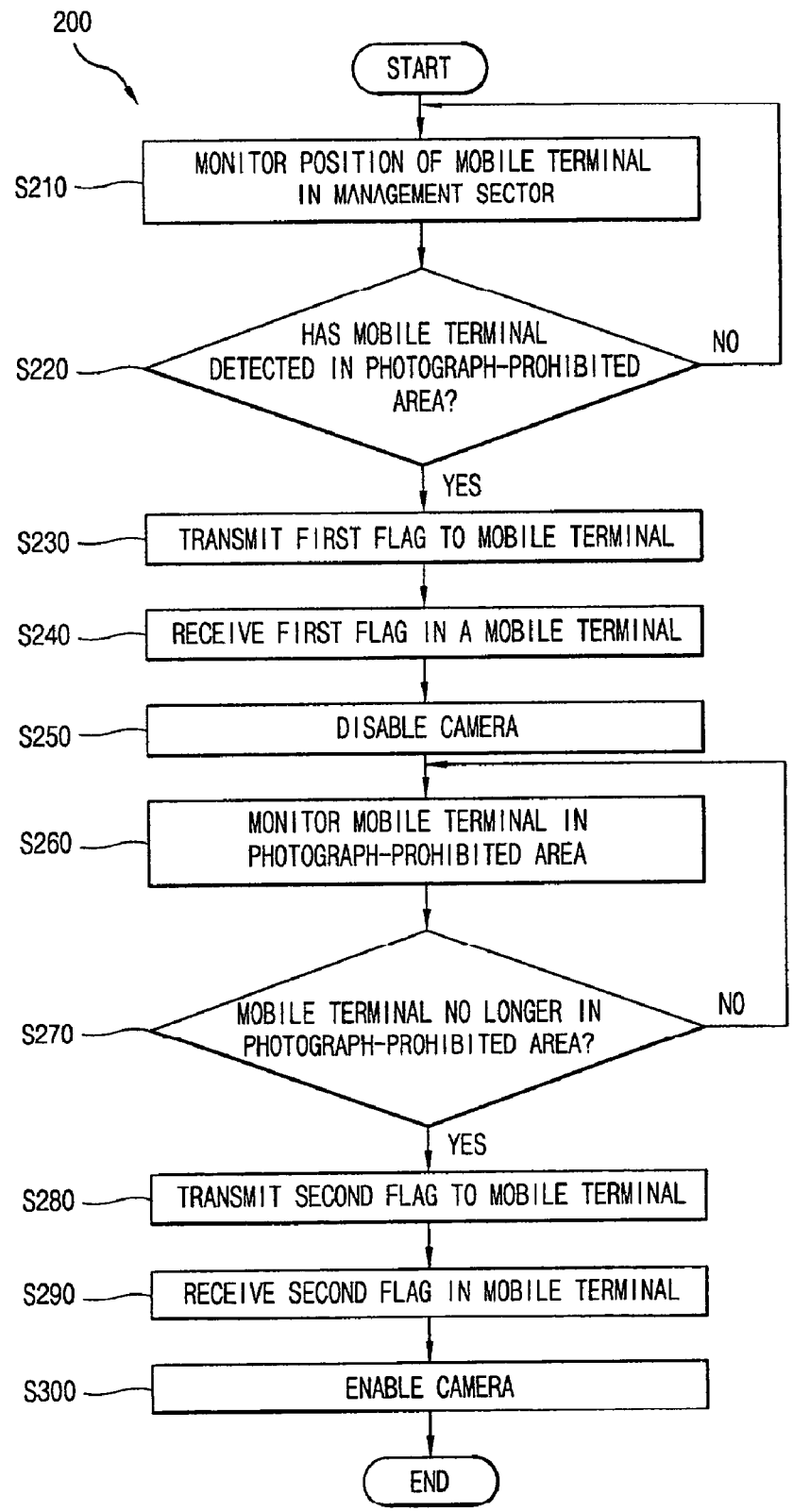
FIG. 4 illustrates a flow chart of a method for restricting use of a camera mounted in a mobile terminal in accordance with another embodiment of the present invention.

FIG. 4 illustrates a flow chart of another embodiment of a method for restricting use of a camera mounted in a mobile terminal. The method 200 includes monitoring the position of mobile terminals 160-1 to 160-N in a management sector 156 having one or more photograph-prohibited areas 151, 152 (S210), detecting a mobile terminal 160-1, 160-2 in a photograph-prohibited area (S220), transmitting a first flag to the mobile terminal in the photograph-prohibited area (S230), receiving the first flag in the mobile terminal (S240), disabling the camera in the mobile terminal (S250), continuing to monitor the position of the mobile terminal 160-1, 160-2 to which the first flag was transmitted (260), detecting that the mobile terminal to which the first flag was transmitted is no longer in a photograph-prohibited area (S270), transmitting a second flag to the mobile terminal (S280), receiving the second flag in the mobile terminal (S290) and enabling the camera in the mobile terminal (S300).

In step S210, a network 154 monitors the position of all mobile terminals 160-1 to 160-N within a management sector 156. The method 200 may include receiving position information regarding the mobile terminals 160-1 to 160-N from a GPS satellite and storing the position information in memory.

Upon determining in step S220 that a mobile terminal 160-1, 160-2 is within a photograph-prohibited area 151, 152, the network 154 transmits a first flag to the mobile terminal in step S230 through a certain channel. The certain channel may be a paging channel.

The first flag includes photographing prohibition information. When a mobile terminal 160-1, 160-2 within a photograph-prohibited area 151, 152 receives the first flag in step S240, the camera mounted therein is disabled in step S250.

The network 154 continues to monitor the mobile terminal 160-1, 160-2 to which the first flag was transmitted in step S260. Upon determining that a mobile terminal 160-3 to which a first flag was previously transmitted has moved outside the photograph-prohibited areas 151,152 in step S270, the network 154 transmits a second flag to the mobile terminal in step S280.

The second flag includes photographing prohibition release information. When a mobile terminal 160-3 that has moved outside the photograph-prohibited areas 151, 152 receives the second flag in step S290, the camera mounted therein is enabled in step S300.

Figure 5:
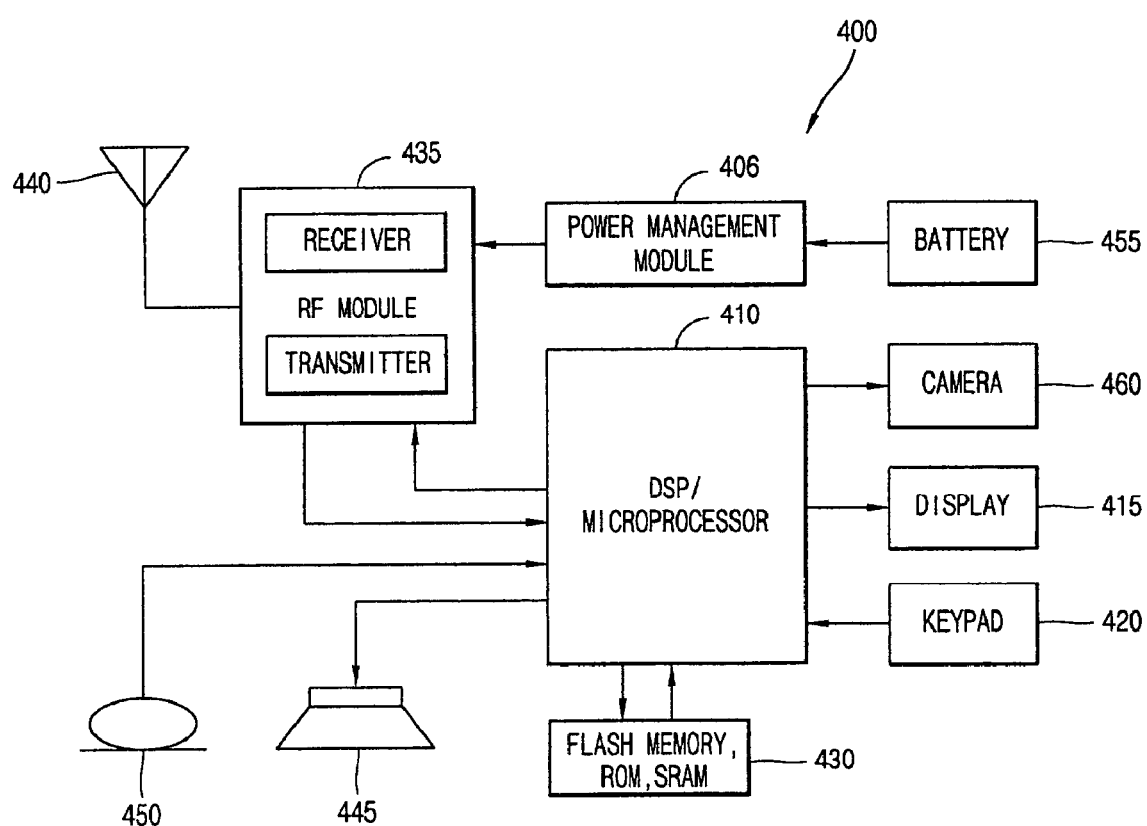
FIG. 5 illustrates a mobile terminal for restricting use of a camera mounted therein in accordance with one embodiment of the present invention.

Referring to FIG. 5, a block diagram of a mobile terminal 400 according to one embodiment of the present invention is illustrated, for example a mobile phone for performing the methods of the present invention. The mobile terminal 400 includes a processing unit 410 such as a microprocessor or digital signal processor, an RF module 435, a power management module 406, an antenna 440, a battery 455, a display 415, a keypad 420, a storage unit 430 such as flash memory, ROM or SRAM, a speaker 445, a microphone 450 and a camera 460. The processing unit 410 is adapted to disable the camera 460, for example by restricting a photographing function, upon receipt of a control signal such as a flag when the mobile terminal 400 is in a photograph-prohibited area and enable the camera when the mobile terminal is not within a photograph-prohibited area.

In one embodiment, the processing unit 410 is adapted to operate a timer upon disabling the camera 460 and determine if another flag is received before the timer expires in order to either enable the camera when the mobile terminal 400 is no longer within a photograph-prohibited area or reset the timer when the mobile terminal 400 is still within a photograph-prohibited area. It is contemplated that the storage unit 430 may be adapted to store a preset timer timeout value.

In another embodiment, the processing unit 410 is adapted to receive a first flag through a certain channel and disable the camera 460 when the mobile terminal 400 is within a photograph-prohibited area and to enable the camera upon receipt of a second flag when the mobile terminal is no longer within a photograph-prohibited area. It is contemplated that the certain channel may be a paging channel. It is further contemplated that the first flag includes photographing prohibition information and the second flag includes photographing prohibition release information.

Figure 6:
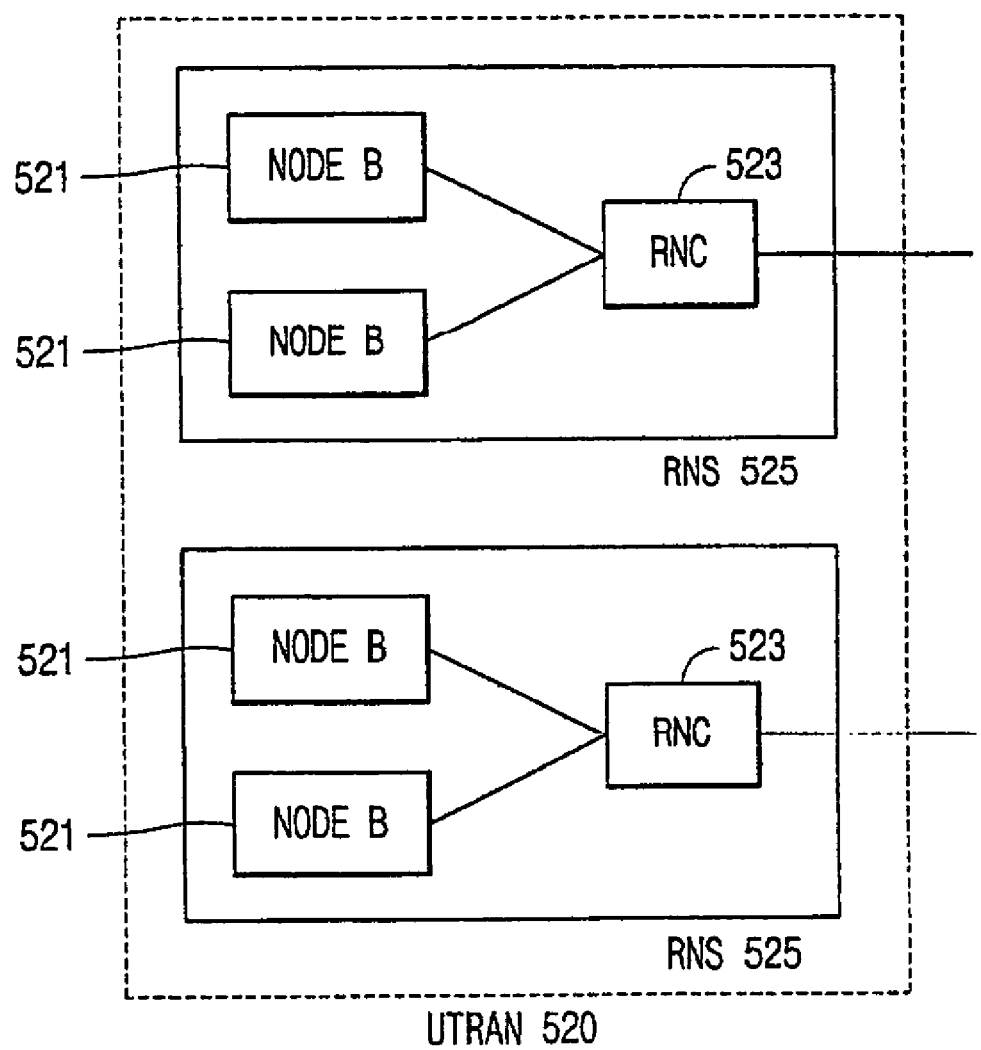
FIG. 6 illustrates a network for restricting use of a camera mounted in a mobile terminal in accordance with one embodiment of the present invention

FIG. 6 illustrates a block diagram of a network 520 according to one embodiment of the present invention. The network 520 includes one or more radio network sub-systems (RNS) 525. Each RNS 525 includes a radio network controller (RNC) 523 and a plurality of Node-Bs (base stations) 521 managed by the RNC. The RNC 523 handles the assignment and management of radio resources and operates as an access point with respect to the core network 30. Furthermore, the RNC 523 is adapted to perform the methods of the present invention.

The Node-Bs 521 receive information sent by the physical layer of the terminal 410 through an uplink, and transmit data to the terminal through a downlink. The Node-Bs 521 operate as access points, or as a transmitter and receiver, of the UTRAN 520 for the terminal 410. It will be apparent to one skilled in the art that the mobile terminal 400 may be readily implemented using, for example, the processing unit 410 or other data or digital processing device, either alone or in combination with external support logic.

By utilizing the present invention, the use of a camera mounted in a mobile terminal may be restricted in photograph-prohibited areas by disabling the camera. The camera is disabled only until the mobile terminal in which it is mounted is no longer in a photograph-prohibited area. Security and personal privacy may be protected with little inconvenience to the user.

In addition, a desired photograph-prohibited area may be variably set, changed and managed by using a simple and low-cost local area communication unit or, in the case of a wide-range area, a photograph-prohibited area can be managed by using a network. Thus, implementation is easy and utilization is efficient.

It will be apparent to one skilled in the art that the preferred embodiments of the present invention can be readily implemented using, for example, the processor 410 or other data or digital processing device, either alone or in combination with external support logic.

Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain of the logic operations may be performed in a different order, modified or removed and still implement preferred embodiments of the present invention. Moreover, steps may be added to the above described logic and still conform to implementations of the invention.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for restricting use of a camera mounted in a mobile terminal, the method comprising:

sending a control signal to the mobile terminal that is within a photograph-prohibited area, the control signal indicating that camera use is prohibited;

receiving the control signal in the mobile terminal;

disabling the camera of the mobile terminal; and enabling the camera of the mobile terminal when the mobile terminal is no longer within the photograph-prohibited area, wherein sending the control signal to the mobile terminal comprises:

monitoring a position of at least one mobile terminal within a management sector, the management sector comprising at least one photograph-prohibited area;

detecting that one of the at least one mobile terminal has entered the at least one photograph-prohibited area; and transmitting a first flag to the one of the at least one mobile terminal in the at least one photograph-prohibited area through a certain channel, wherein disabling the camera of the mobile terminal comprises:

the one of the at least one mobile terminal restricting a photographing function of the camera upon receiving the first flag, and wherein enabling the camera of the mobile terminal comprises:

operating a timer upon receiving the first flag; and resetting the timer or enabling the camera, resetting the timer in response to a subsequent flag received prior to expiration of the timer such that the camera remains disabled when the timer is reset and enabling the camera if no subsequent flag is received prior to the expiration of the timer.

2. The method of claim 1, wherein sending the control signal to the mobile terminal further comprises periodically transmitting a flag.

3. The method of claim 2, wherein the flag is transmitted via local area wireless communication.

4. The method of claim 3, wherein the local area wireless communication comprises at least one of Bluetooth®, IrDA (Infrared Data Association) or RF.

5. The method of claim 1, wherein the first flag and the subsequent flag comprise photographing prohibition information.

6. The method of claim 1, wherein the certain channel comprises a paging channel.

7. The method of claim 1, wherein monitoring the position of the at least one mobile terminal within the management sector comprises receiving position information from a GPS satellite and storing the position information in a memory.

* * * * *